Sept. 24, 1935.  E. W. MADGE  2,015,530
METHOD OF AND APPARATUS FOR THE PRODUCTION
OF GOODS OF RUBBER OR SIMILAR MATERIAL
Filed Sept. 14, 1934
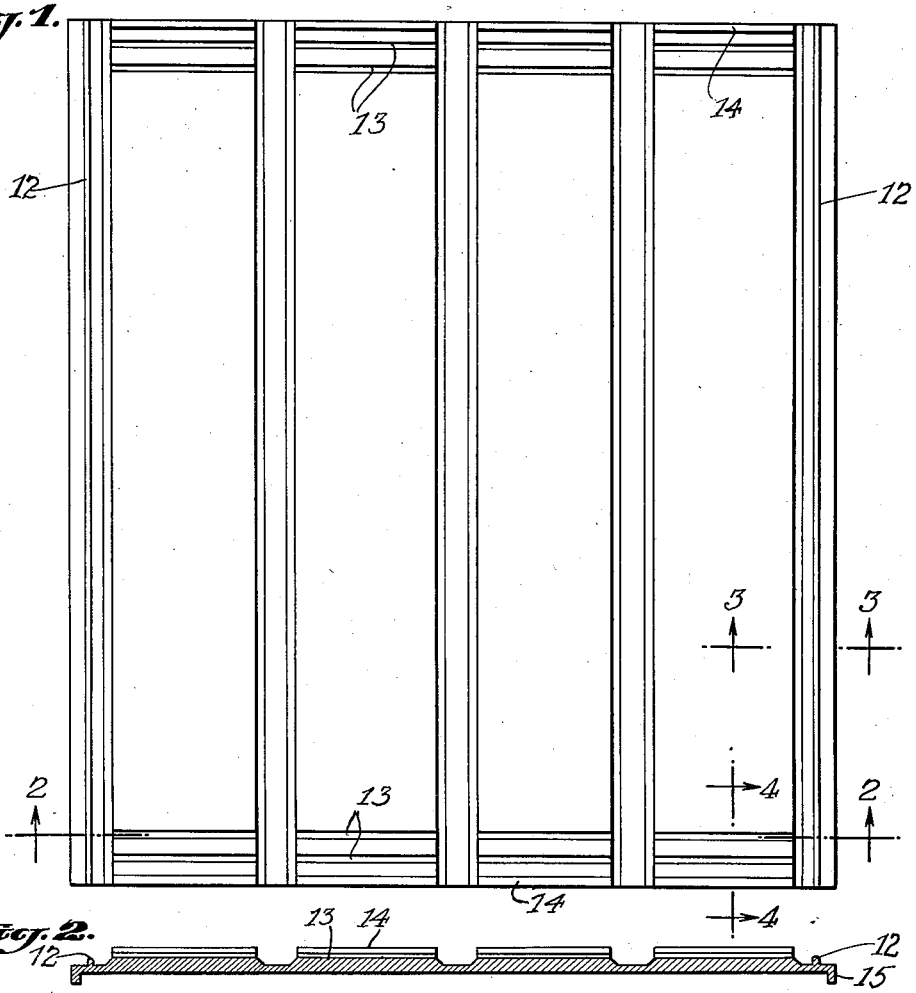
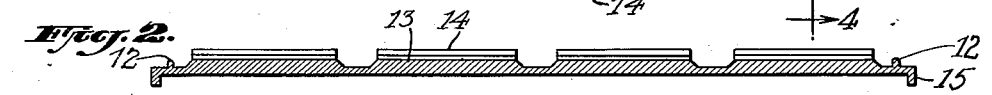
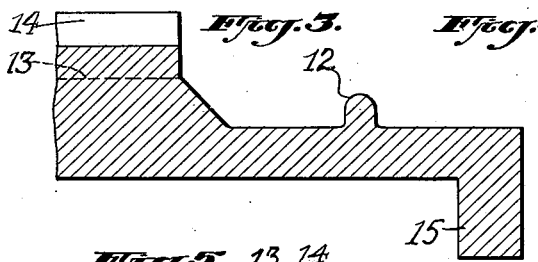
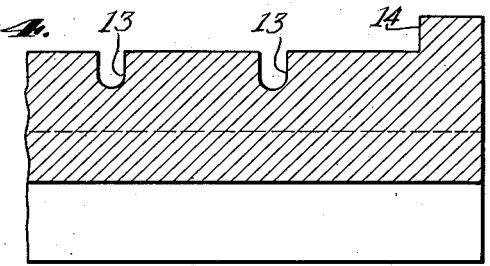
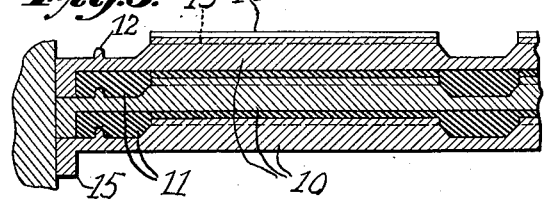
INVENTOR.
BY Evelyn William Madge.
ATTORNEYS Patented Sept. 24, 1935

2,015,530

UNITED STATES PATENT OFFICE 2,015,530

METHOD OF AND APPPARATUS FOR THE PRODUCTION OF GOODS OF RUBBER OR SIMILAR MATERIAL

Evelyn William Madge, Stockland Green, Birmingham, England, assignor to Dunlop Rubber Company, Limited, London, England, a British corporation Application September 14, 1934, Serial No. 743,963
In Great Britain December 20, 1929

7 Claims. (Cl. 18—39)

My invention relates more particularly to the vulcanizing of gelled aqueous dispersions of rubber compositions under such conditions that evaporation of the aqueous dispersing medium is prevented in order to obtain molded articles of porous or microporous vulcanized rubber. Battery separators and filtering means such as plates and cones are examples of articles of the above type that may be made according to my invention.

The present invention is a continuation in part of my co-pending application Ser. No. 503,173 filed December 8, 1930.

In forming micro-porous articles the gelled dispersions used for the production of porous or micro-porous articles tend to contract or shrink because of syneresis upon the application of heat during vulcanization. Owing to this contraction considerable distortion may take place in the plane of such articles as battery separators and filter plates or cones whereby the edges of said articles are drawn inwardly giving them an undesirable concave form.

An object of my present invention is to provide a method of forming and vulcanizing flat molded articles of gelled aqueous dispersions of rubber whereby undesirable shinking of the area of the plate may be avoided and to provide a mold to hold the gelled dispersion against such contraction.

Another object of the invention is to prevent contraction in the plane of the articles during their formation and while they are being subjected upon the backing strata or molds to the heat treatment, thereby producing articles corresponding substantially to the configuration of the backing strata or molds.

According to the invention the dispersions are molded and gelled in flat molds having walls or backs which are provided with narrow marginal grooves or reliefs extending around the periphery of the back at a short space from the edges thereof and capable of giving a keying or wedging action. The grooves are accordingly so spaced on the surfaces of the molds or backing strata as more or less to enclose wholly or partly the articles produced along those contours or edges which are required to remain undistorted. These grooves thereby serve to anchor the marginal areas of the molded gelled dispersion preventing these edges from being drawn inwardly or distorted during the heating and vulcanization.

According to the invention it has been found that if grooves or reliefs, for example, of the order of 1/16th of an inch in depth are so spaced on the surfaces of the molds or backing strata at the margins of the articles to be produced, it is possible to prevent distortion along those contours or edges parallel to the aforesaid narrow grooves or reliefs.

Any suitable aqueous emulsions or dispersions of rubber material may be used as, for example, those consisting of or containing rubber, gutta-percha, balata or similar vegetable resins occurring naturally or artificially obtained. Aqueous dispersions of coagulated rubber, vulcanized rubber, synthetic rubber, waste or reclaim, may also be employed, if desired, as alternatives or admixtures. The dispersions may contain the usual known compounding ingredients and/or may be in concentrated form. All such materials are herein included under the generic term of rubber dispersions.

For example, a latex which has been compounded and then concentrated as described in Patent No. 1,846,164 granted February 23, 1932, may be used.

The dispersions which have been so treated as to render them capable of gelling, either in the cold or by the application of heat, may be used.

The accompanying diagrammatic drawing illustrates an example of an apparatus suitable for carrying the invention into effect.

Fig. 1 is a diagrammatic plan of a mold plate suitable for the production of battery separators or the like in accordance with my invention; Fig. 2 is a sectional elevation taken on line 2—2 of Fig. 1 of the mold plate shown in Fig. 1; Fig. 3 is an enlarged section of the mold taken on line 3—3 of Fig. 1; Fig. 4 is an enlarged sectional view on lines 4—4 of Fig. 1; Fig. 5 is a part section similar to that of Fig. 2 and on a somewhat larger scale showing a number of mold plates in spaced position and with the mold cavities filled with rubber material; Fig. 6 is a view taken similar to that of Fig. 4, showing spaced mold plates with the cavities between the plates filled with rubber material.

In my invention the aqueous dispersion to be formed into a molded microporous article is poured into a flat mold or between a pair of lightly spaced flat mold plates having at least one of said mold faces grooved and ribbed as shown in the accompanying drawing. A quantity of the dispersion may be poured on to a plate and another plate pressed downwardly to expel any excess of dispersion while the latter is still fluid and thereby to fill the narrow space between the plates in and without air pockets. Or the plates may be placed in a container fitting the edges with the faces of the plates vertical, the space between the plates may then be filled with a fluid dispersion and the plates pressed together to the proper distance as determined by spacing ridges or elements. There is thus formed a series or succession of spaced plates 10 and separate bodies 11 of aqueous rubber dispersions between successive plates. These dispersions are then gelled by any suitable gelling agent whereby the dispersed rubber becomes the dispersing medium enclosing the aqueous medium dispersed in microscopic droplets in a network of rubber material. The gel is then heated and vulcanized in known manner for preventing the evaporation of water until after vulcanization is completed, whereupon each microscopic droplet of water leaves a pore upon drying.

During the vulcanizing the gel tends to shrink and thus to draw inwardly from the edges and be deformed. In the present invention the gel is maintained in position by marginal anchoring means. One anchoring means comprises the marginal ribs 12 which project sidewise into the gelled mass between the plates as indicated in Fig. 5. Another anchoring means, are grooves 13 which as shown in Fig. 6 become filled with the gelled dispersion 10 and thus serve as anchorages, preventing the edges from being drawn inwardly. In the accompanying drawing both the ridges and the grooves are illustrated on a single plate but it will be understood that this is merely a manner of convenience in illustration and that the plate may be used on other combinations or grooves and ridges than the specific forms shown, or may use only ridges or grooves.

The plates are also preferably provided with ribs or flanges 14 and 15, which serve to space one plate a proper distance from the other to provide the desired thickness for the body of dispersion once the plates have been pressed into spaced position as indicated in Fig. 5.

The above anchorages serve effectively to hold the gelled dispersion from drawing inwardly from the marginal edges during the step of vulcanization and thereby tend to maintain the shape of the mold in the finished article.

Various modifications may be made by those skilled in the art without departing from the invention as defined in the appended claims.

What I claim is:—

1. A method of vulcanizing gelled dispersions of rubber in plates without shrinking which comprises forming the dispersion into a plate shape, confining the lateral surfaces of said plate, engaging said formed plate laterally throughout its edge portions, and vulcanizing the rubber of said dispersion without loss of water therefrom while thus confined and engaged and while said engaged edge portions are rigidly held against inward movement.

2. A method of vulcanizing gelled dispersions of rubber in thin flat plates without shrinking which comprises forming the dispersion to a thin flat shape and with the lateral surfaces displaced laterally near the border, rigidly engaging and supporting said displaced border portions throughout the border, and vulcanizing the rubber of said plate while said border portions are rigidly engaged.

3. A method of vulcanizing a thin plate of rubber having dispersed microscopic spaces which comprises, laterally displacing the border surfaces of said plate, rigidly engaging and holding said displaced surfaces throughout the border, and vulcanizing said rubber while said border is thus engaged and held.

4. A method of vulcanizing a thin plate of rubber having displaced microscopic spaces which comprises forming ridges and grooves on the border area of said plate rigidly engaging and holding said ridges and border throughout the border from displacement inwardly of said edges, and vulcanizing said rubber plate while said borders are thus engaged and held.

5. A mold of the type described which comprises a pair of slightly spaced mold surfaces, and anchoring ridges at the edges of said mold surfaces throughout the border of said mold surfaces.

6. A mold of the type described which comprises a pair of slightly spaced mold surfaces, and anchoring grooves at the edges of said mold surfaces and throughout the border of said mold surfaces.

7. A mold of the type described having a pair of plates having spaced plane surfaces and having border areas slightly displaced into relative grooves and ridges to form retaining anchorages at and throughout said borders.

EVELYN WILLIAM MADGE.